F. T. KITCHEN.
TEMPERATURE REGULATOR.
APPLICATION FILED APR. 1, 1915.

1,152,027.

Patented Aug. 31, 1915.

WITNESSES:
René Muine
Ned White

INVENTOR
Frederick T. Kitchen,
By Attorneys,
Fraser Tuck & Myers

UNITED STATES PATENT OFFICE.

FREDERICK T. KITCHEN, OF NEW YORK, N. Y., ASSIGNOR TO GOLD CAR HEATING & LIGHTING COMPANY, OF NEW YORK, N. Y., A CORPORATION OF NEW YORK.

TEMPERATURE-REGULATOR.

1,152,027.  Specification of Letters Patent.  Patented Aug. 31, 1915.

Application filed April 1, 1915.  Serial No. 18,536.

*To all whom it may concern:*

Be it known that I, FREDERICK T. KITCHEN, a citizen of the United States of America, residing in West New Brighton, Staten Island, in the borough of Richmond, city and State of New York, have invented certain new and useful Improvements in Temperature-Regulators, of which the following is a specification.

My invention relates to temperature regulators for use in connection with automatically operated electric heating systems and has for its object to provide means whereby to reduce arcing and sparking in the thermostatic controlling devices for said regulator.

My invention is particularly adapted for use in connection with thermostatic devices for controlling electric heating systems. It is applicable for use in car heating systems, either surface or railway cars, or with the heating systems used for heating buildings, etc. In practice the heating circuit usually contains a magnetic switch, and this switch is controlled by the operation of a thermostat. The magnetic switch requires considerable current to start it, in the neighborhood of 50 watts, but a less current, say 13 watts, will be sufficient to hold the armature to the core after the magnet is energized. The power obtained from the slight variations in temperature at which it is desired that the thermostat should operate is insufficient to separate the thermostatic contact points with the desired quick break. Therefore, if a current is passing through the shunt containing the thermostat, sufficient to energize the magnet, destructive arcing will take place between the thermostatic contact points when they are separated by the action of the thermostat and they will be destroyed.

The invention consists in providing means whereby after the thermostat has closed the shunt circuit and sufficient current has passed therethrough to energize the magnet, a resistance is cut into said circuit by the action of the magnet and the current thereafter flowing through the shunt is lessened so that upon the separation of the thermostatic contact points no destructive arcing will take place.

A desirable form in which the invention may be embodied is illustrated in the accompanying drawing wherein,—

Figure 1:
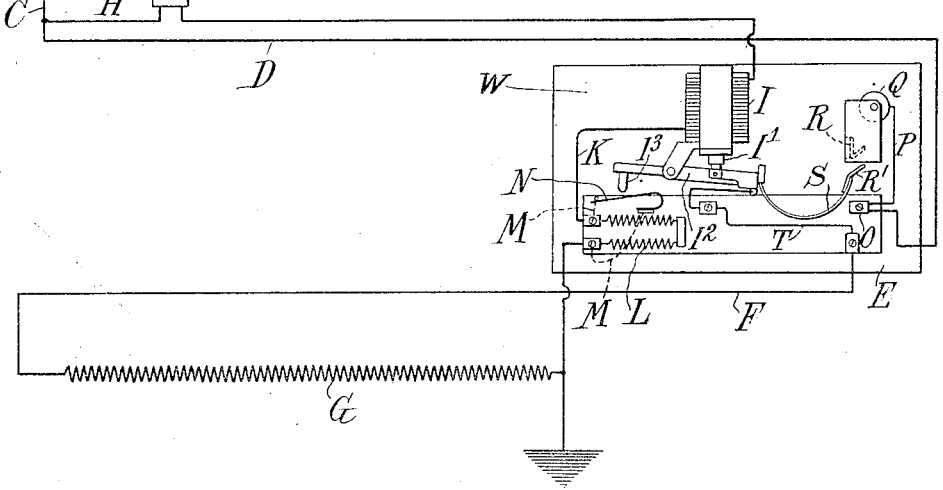
Figure 2:
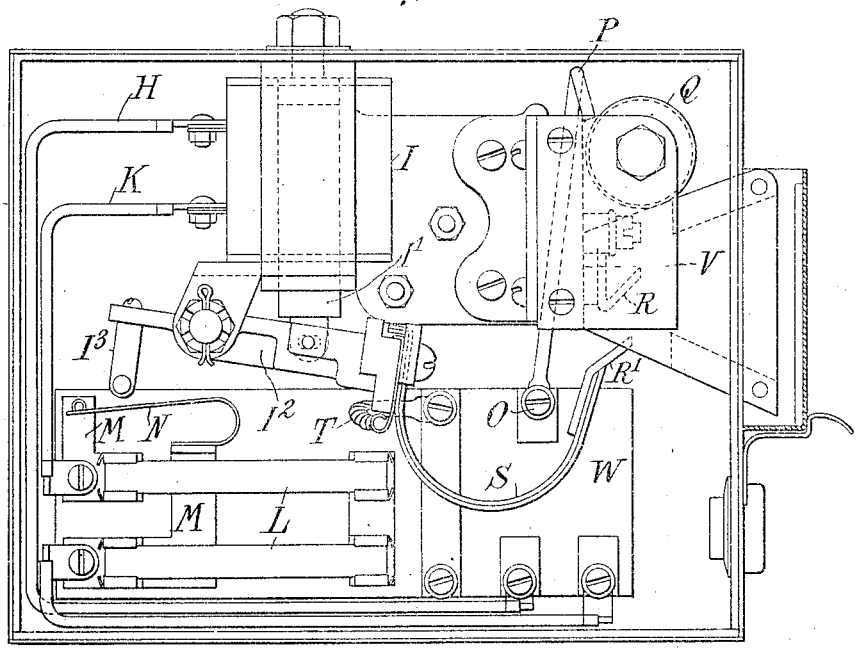

Figure 1 is a diagrammatic representation of the wiring; and Fig. 2 is a plan view of the magnetic switch and resistance controlling devices.

In the diagrammatic view of the wiring the source of electricity indicated at A may be an overhead trolley. The heating circuit from this passes through switch B, wires C, D, the controlling apparatus E, and from thence by wire F to heater G and the ground. A shunt circuit H leads from the wire C to a magnet I in the controller E. This shunt circuit contains a thermostat J which is not illustrated specifically as many types of such thermostats are known and are capable of being utilized in connection with my invention, and as the particular type of thermostat forms no part of this present invention. The thermostat is controlled as usual by the temperature of the surrounding atmosphere and as the said temperature gets colder the thermostat closes the electric circuit H and energizes the magnet I, and as the temperature gets hotter it opens the said circuit and deënergizes the magnet. The shunt circuit H is connected to the magnet I and a ground wire K leads from the said magnet through the resistance L to the ground. A shunt M (shown in dotted lines in Fig. 1) is looped into the said ground circuit K around the resistance L and contains a spring switch N. Shunt M, switch N, and resistance L are mounted on insulated block W.

The heater circuit D leads into the controller where it is connected to the binding post O from which it passes through wire P to the magnetic blow-out Q and from thence to terminal R of the main heating switch. The other and movable terminal $R^1$ of the said heating switch is connected to the armature $I^1$ of the solenoid I so as to be operated thereby and close the said switch when the magnet is energized, and when the switch is closed the current passes from the said contact points R, $R^1$ to switch arm S, wires T, F, heater G and the ground. Switch R and blow-out Q are mounted on insulated block V.

Pivoted to the armature $I^1$ of the magnetic solenoid which controls switch arm S is a rocking lever $I^2$ which is pivotally mounted in a fixed part of the device and is provided with a tail-piece I³ which is adapted to press against the spring switch N when the magnet is energized and open the shunt or loop M around the resistance L in the ground circuit K from the magnet I, and accordingly cut the said resistance L into the circuit.

In the operation of my device the switch B being closed, current will be taken at A and upon the temperature in the apartment containing the thermostat J falling to a sufficient extent so that additional heat is required for the said apartment, the said thermostat will close the circuit H passing through the magnet I and sufficient current will pass through the shunt H to energize the magnet, and thence through circuit K, spring switch N and loop M to the ground. The said circuit H will pass sufficient current to operate the magnet which will be in the neighborhood of 50 watts. Thereupon the magnet being energized will attract its armature I¹ closing the heating circuit at R, R¹ and causing a circuit to be closed from the wire C through D, O, P, R, R¹, S, T, F, heater G and the ground. The tail-piece I³ of the lever I² will, when the magnet is energized press against spring switch N, opening the loop M around the resistance L and causing the circuit from the magnet to pass through wire K, and resistance L to the ground. Thereupon the said resistance will cause a less current to flow through the shunt circuit H which, however, will be sufficient to hold the armature I¹. When the apartment becomes sufficiently heated the contact points in the thermostat will separate and the lessened current then flowing through the shunt H will cause this operation to be unaccompanied by any destructive sparking. Thereupon, the magnet I will be deënergized, the armature I¹ will drop, breaking the heating circuit. The foregoing operation will be repeated as frequently as the temperature in the car drops, indicating that a further supply of heat is necessary.

I have illustrated the most desirable form now known to me of constructing my invention, but the same may be modified and equivalent devices substituted for those now employed within the limits of the appended claims.

What I claim is:—

1. A temperature regulator comprising a heating circuit having an electrical heater therein, a shunt circuit, a thermostat in said shunt circuit affected by the temperature of the apartment, a magnet in said shunt circuit controlled wholly by said thermostat and energized only when said thermostat closes said shunt and deënergized when the thermostat opens said shunt, a switch operated by said magnet and adapted to close the heater circuit when the magnet is energized upon the closing of the shunt circuit by the thermostat, and means for throwing resistance into the shunt circuit when the said magnet is energized.

2. A temperature regulator comprising a heating circuit having an electrical heater therein, a shunt circuit, a thermostat in said shunt circuit affected by the temperature of the apartment, a magnet in said shunt circuit controlled wholly by said thermostat and energized only when said thermostat closes said shunt and deënergized when the thermostat opens said shunt, a switch adapted to close the heater circuit when the magnet is energized upon the closing of the shunt circuit by the thermostat, a resistance in the ground wire from said magnet, a shunt around said resistance, and a bar pivotally mounted in a fixed part of the device and operatively connected to the armature and adapted when the armature is attracted upon the energizing of the magnet to close the heater switch and at the same time to open the shunt around the resistance.

3. A temperature regulator comprising a heating circuit having an electrical heater therein, a shunt circuit, a thermostat in said shunt circuit affected by the temperature of the apartment, a magnet in said shunt circuit controlled wholly by said thermostat and energized only when said thermostat closes said shunt and deënergized when the thermostat opens said shunt, a magnet in said shunt, a switch in the heating circuit operated by the armature of said magnet and adapted to close the heating circuit when the magnet is energized, a resistance in the ground wire from said magnet, a shunt around said resistance, a spring switch in said shunt and a tail-piece to said heating circuit switch adapted to open said spring switch when the magnet is energized.

In witness whereof, I have hereunto signed my name in the presence of two subscribing witnesses.

FREDERICK T. KITCHEN.

Witnesses:
HENRY M. TURK,
FRED WHITE.